March 31, 1953  J. MUNIZ  2,633,278
BOTTLE HOLDER FOR GROCERY CARTS
Filed Nov. 29, 1950
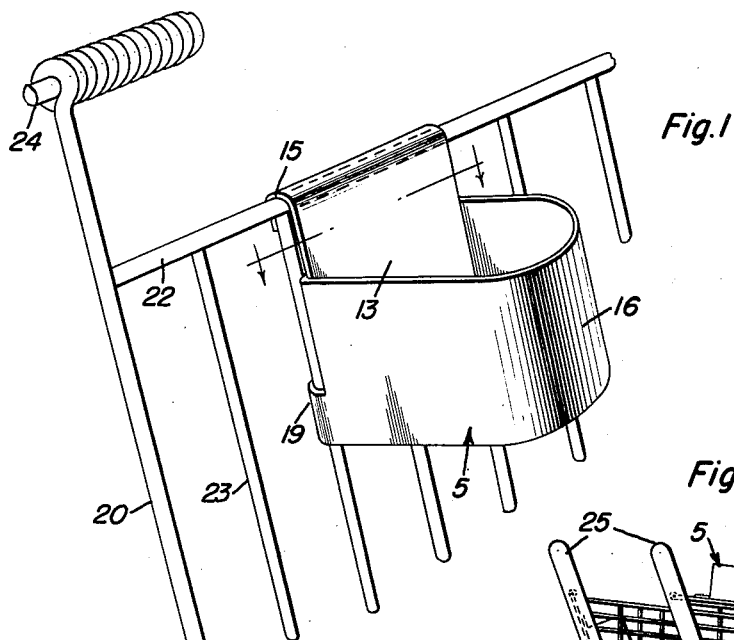
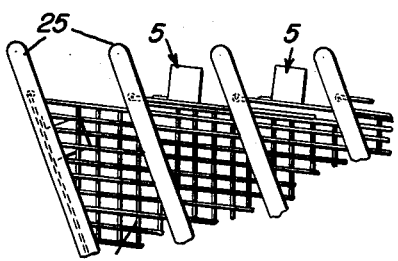
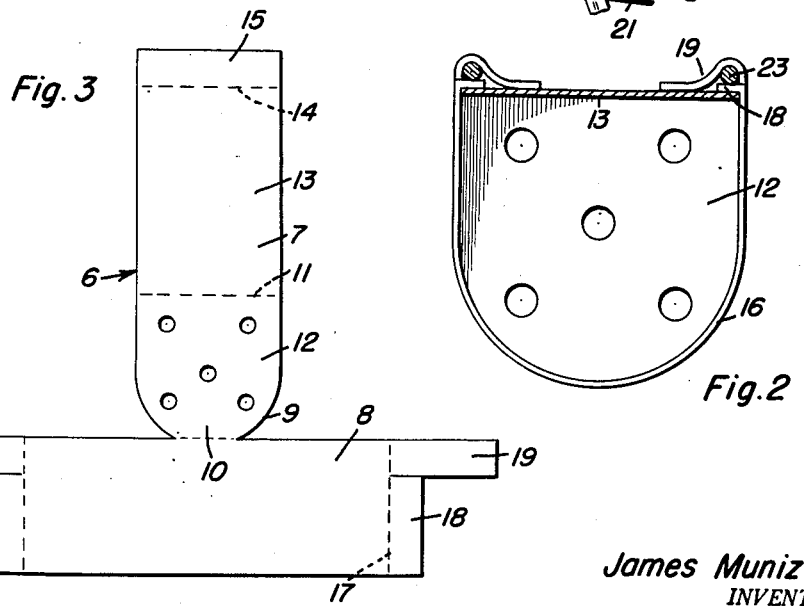
James Muniz
INVENTOR.
BY
*Clarence A. O'Brien*
*and Harvey B. Jackson*
Attorneys Patented Mar. 31, 1953

2,633,278

UNITED STATES PATENT OFFICE 2,633,278

BOTTLE HOLDER FOR GROCERY CARTS

James Muniz, Key West, Fla.

Application November 29, 1950, Serial No. 198,178

5 Claims. (Cl. 224—42.46)

The present invention relates to new and useful improvements in bottle holders for use with wheeled baskets or carts of a type commonly used in grocery stores.

An important object of the invention is to provide a bottle holder which may be attached to the wire basket portion of a cart to hold a soft drink bottle in order that a refreshing drink may be available to a customer while pushing the cart along the aisles of a grocery store.

Another object is to provide a bottle holder which may be easily and quickly attached to the cart without necessitating any changes or alterations in the construction thereof and without interfering with the stacking of the carts when not in use.

A further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a sectional view taken on a line 2—2 of Figure 1;

Figure 3 is a plan view of a sheet metal blank forming the holder; and

Figure 4 is a side elevational view showing the position of the bottle when a group of carts are stacked.

Referring now to the drawing in detail, wherein for the purpose of illustration I have disclosed a preferred embodiment of my invention, the numeral 5 designates the bottle holder generally and which may be formed of a blank 6 of sheet metal or other suitable material and of substantially T-shape to provide a stem portion 7 and a cross-head portion 8. Stem portion 7 is formed with curved tapering side edges 9 at its inner end to provide a relatively narrow connecting web 10 with the cross-head portion 8.

Stem portion 7 is bent at the connecting web at right angles to cross-head 8 and the outer end of the stem portion is also bent along a transverse line 11 to form a bottom 12 and a back 13. The upper end of back 13 is bent along a transverse line 14 to form a channel shaped hanger 15.

The cross-head 8 is curved rearwardly at each end in the arc of the curved side edges 9 of stem 7 to form a basket or receptacle portion 16 of the holder and the ends of the cross head are bent along transverse lines 17 behind back 13 to form locking tongues 18 for locking the basket portion to the back.

The end edges of the cross-head 8 are also formed with bendable tongues 19.

The bottle holder 5 is attached to the inside of the back 20 of a wire cart 21 by hooking the hanger 15 over the top rail 22 of the back of the cart and bending the tongues 19 behind a pair of the vertical rods 23 of the cart, whereby a soft drink bottle (not shown) may be placed in the holder within convenient reach of a person pushing the cart.

The back 20 of the cart is usually constructed for swinging upwardly on a cross bar 24 in order to stack or telescope the carts, one within the other, as shown in Figure 4, and the bottle holder 5 swings upwardly with the back between the handles 25 of the stacked carts to permit the usual stacking arrangement.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bottle holder comprising a sheet metal receptacle portion including a back, having an inverted channel at its upper edge adapted for hooking over the upper edge of a wire supporting structure, bendable tongues at the side edges of the receptacle portion locked behind the back, and bendable tongues also at the side edges of the receptacle portion locked behind the reticulations of the supporting structure.

2. In combination with a wheeled basket, a bottle holder comprising a vertically extending back plate, a bottom plate integral with and extending outwardly from said back plate, a side wall plate integral with said bottom plate surrounding said bottom plate, the ends of said side wall plate each having a pair of tongues thereon, one of said tongues securing one of said ends to said back wall and the other of said tongues securing the bottle holder to the basket, the upper edge of said back plate being of inverted channel shape and further securing the holder to the basket.

3. The combination of claim 2, wherein said bottom plate has drainage apertures therein.

4. A bottle holder comprising a back plate, a bottom plate extending outwardly from said back plate, side walls surrounding said bottom plate, the ends of said side walls each having a pair of tongues thereon, one of said tongues embracing the back wall and securing the side wall thereto, the other of said tongues being hook-shaped for securing the holder to a wire supporting structure, the upper edge of the back plate being of inverted channel shape.

5. A bottle holder comprising a receptacle including a back, bottom and side walls, a hanger on the upper edge of the back adapted for hooking over a wire supporting structure, a pair of tongues on each side wall end, one of said tongues embracing said back plate, the other of said tongues being hook-shaped and adapted for engagement behind the reticulations of the supporting structure.

JAMES MUNIZ.

REFERENCES CITED

The following references are of record in the file of this patent:

UNITED STATES PATENTS

| Number | Name | Date |
| --- | --- | --- |
| 1,276,905 | Hall | Aug. 27, 1918 |
| 1,413,849 | Haggard | Apr. 25, 1922 |
| 1,746,634 | Breneman | Feb. 11, 1930 |
| 1,863,988 | Kupfer | June 21, 1932 |
| 2,088,387 | Rice, Jr., et al. | July 27, 1937 |
| 2,116,148 | Hawley | May 3, 1938 |